United States Patent
Kang et al.

(10) Patent No.: US 8,396,354 B2
(45) Date of Patent: Mar. 12, 2013

(54) DISPLAY APPARATUS, METHOD, AND COMPUTER SYSTEM

(75) Inventors: Eun-goo Kang, Seoul (KR); Yong-hoon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1156 days.

(21) Appl. No.: 11/126,281

(22) Filed: May 11, 2005

(65) Prior Publication Data

US 2006/0010259 A1  Jan. 12, 2006

(30) Foreign Application Priority Data

May 11, 2004  (KR) ........................ 10-2004-0033152

(51) Int. Cl.
  *H04N 5/77*  (2006.01)
(52) U.S. Cl. ........................................ 386/360
(58) Field of Classification Search ............ 386/95, 386/46, 125–126, 124, 231, 234, 358, 359, 386/360, 361, 362, 219, 220
  See application file for complete search history.

(56) References Cited

U.S. PATENT DOCUMENTS

| 4,916,541 | A | * | 4/1990 | Hashimoto et al. | 348/448 |
| 5,999,698 | A | * | 12/1999 | Nakai et al. | 386/230 |
| 6,272,283 | B1 | * | 8/2001 | Nguyen | 386/94 |
| 6,633,933 | B1 | * | 10/2003 | Smith et al. | 710/74 |
| 6,865,621 | B2 | | 3/2005 | Iwata | |
| 6,895,448 | B2 | * | 5/2005 | Chan et al. | 710/14 |
| 7,209,179 | B2 | * | 4/2007 | Dai et al. | 348/552 |
| 7,260,318 | B2 | * | 8/2007 | Wang et al. | 386/126 |
| 2002/0071055 | A1 | | 6/2002 | Ooshima et al. | |
| 2003/0128183 | A1 | | 7/2003 | Chang | |
| 2005/0019022 | A1 | * | 1/2005 | Lee | 386/125 |
| 2005/0163493 | A1 | * | 7/2005 | Kobayashi et al. | 386/125 |

FOREIGN PATENT DOCUMENTS

| CN | 1330345 | 9/2007 |
| DE | 20104938 U1 | 6/2002 |
| EP | 1156671 A | 11/2001 |
| EP | 1259082 A | 11/2002 |
| EP | 1389760 A | 2/2004 |
| JP | 10-63472 | 3/1998 |

(Continued)

OTHER PUBLICATIONS

Design of a DVD Receiver Using a Single-Chip DVD Processor by Vladimir Mesarovic and Konstantinos Konstantinides (IEEE Transactions on Consumer Electronics, vol. 49, No. 2 May 2003).*

(Continued)

*Primary Examiner* — Tat Chio
(74) *Attorney, Agent, or Firm* — Staas & Halsey LLP

(57) ABSTRACT

A display apparatus and method of displaying an image, and a video signal processor and method of converting an input video signal into a displayable format compatible with the display, including an reproducing apparatus reading out data stored on a medium, a playback part converting the data read by the optical disk drive into a video signal compatible with the video signal processor, an interface transmitting and receiving data to and from an external device, e.g., a computer, and a switching part selectively enabling the reproducing apparatus to communicate with either the drive playback part or the external device. With this configuration, embodiments of the present invention provide a display apparatus, computer system, and methods, using a display apparatus to play back a medium, e.g., a DVD having multimedia functionality, without having to boot the computer system.

20 Claims, 5 Drawing Sheets

FOREIGN PATENT DOCUMENTS

| | | |
|---|---|---|
| KR | 2002-26633 | 4/2002 |
| KR | 2002-95310 | 12/2002 |
| WO | WO02/25943 A | 3/2002 |

OTHER PUBLICATIONS

"Hingucker, Apples G4-iMac MIT 15-Zoll-TFT", CT Magazin Fuer Computer Tecknik, Heise Zeitschriften Verlag, Hannover, DE, No. 5, Jan. 1, 2002 (pp. 136/137 XP001081486, Christopher Laue and Johannes Schuster.

European Search report corresponding to European Patent Application No. 05103940.2 dated Sep. 19, 2008 (in English).

European Office Action dated May 26, 2011 in corresponding European Patent Application 05 103 940.2.

European Oral Proceedings mailed Oct. 21, 2011 issued in corresponding European Patent Application No. 05103940.2.

\* cited by examiner

DISPLAY APPARATUS, METHOD, AND COMPUTER SYSTEM

CROSS-REFERENCE TO RELATED APPLICATIONS

This application claims the priority benefit of Korean Patent Application No. 2004-33152, filed May 11, 2004, in the Korean Intellectual Property Office, the disclosure of which is incorporated herein by reference.

BACKGROUND OF THE INVENTION

1. Field of the Invention

The present invention relates to a display apparatus, method, and computer system, and particularly, a display apparatus/method enabling versatile multimedia functionality without requiring the booting of an operating system of a computer and a computer system using the display apparatus/method.

2. Description of the Related Art

Generally, optical disk drives, for a CD (Compact Disk) or a DVD (Digital Versatile Disk), playing back an optic disk such as a VCD (Video Compact Disk) or a DVD, are available in computer systems with multimedia functionality embedded therein.

Especially, the DVD has 4.7 GB~17 GB of storage capacity for storing video data at high resolution and audio data with multiple channels. Recently, a CD compatible DVD drive has taken the place of a CD drive. The CD compatible DVD drive also stores the video/audio data employing MPEG (Moving Picture Experts Group)-2 video encoding technology and MPEG-2 and AC-3 Audio encoding technology.

Meanwhile, a conventional DVD drive embedded computer system installs a MPEG-2 codec program or a chipset typed MPEG-2 decoder built-in card to decode video and audio signals played back by the DVD drive. Thus, the decoded video/audio signals are output to a monitor or speaker using a video controller or an audio controller.

However, in the conventional DVD drive embedded computer system, to play back the DVD, using the DVD drive, the whole computer system should be booted, and accordingly power is unnecessarily supplied to components of the computer system which are not required for the play back of the DVD. Especially, to play only a movie or music, e.g., an MP3 file, stored in the DVD, an operating system of the computer system should be booted, which further requires booting time.

SUMMARY OF THE INVENTION

Accordingly, it is an aspect of the present invention to provide a display apparatus, method, and computer system, using the display apparatus/method to play back an optical disk drive such as a DVD drive to perform multimedia functionality without booting the whole computer system.

In addition, the present invention provides a display apparatus and method performing multimedia functionality and working like an optical disk drive, which the computer system can perceive, and the computer system using the display apparatus.

The foregoing and/or other aspects of the present invention are also achieved by providing a display apparatus comprising a display to display an image and a video signal processor to convert an input video signal into a displayable format compatible with the display, comprising a reproducing and/or recording drive reading and/or recording data stored in a medium, a drive playback part converting data read by the reproducing and/or recording drive into a video signal and/or audio signal compatible with the video signal processor and/or an audio output part, an interface to transmit the read data to an external device, with the interface permitting transmission of data from the external device to the display apparatus, and a switching part selectively enabling the reproducing and/or recording drive to communicate with either the drive playback part or the interface.

According to an embodiment of the present invention, the display apparatus further comprises the audio output part outputting a sound, and wherein the drive playback part comprises a signal separator separating the data read by the reproducing and/or recording drive into video data and audio data, a video signal converter converting the video data into a video signal format compatible with the video signal processor, and an audio signal converter converting the audio data into an audio signal format compatible with the audio output part.

According to an embodiment of the present invention, the video signal converter may comprise a video decoder decoding the video data, and a format converter converting the video data decoded by the video decoder into the video signal format compatible with the video signal processor. Similarly, the audio signal converter may comprise an audio decoder decoding the audio data According to an embodiment of the present invention, the switching part may select the drive playback part or the interface based on user input.

According to an embodiment of the present invention, the reproducing and/or recording drive may communicate with the drive playback part based on a Advanced Technology Attachment Packet Interface (ATAPI) protocol. The interface may further comprise an interface converter converting data output from the reproducing and/or recording apparatus into a compatible protocol for the external device. The compatible protocol for the external device may be a USB or IEEE 1394 protocol.

According to an embodiment of the present invention, the external device may be a computer, and the drive playback part may convert the data read by the reproducing and/or recording drive for display on the display without requiring the computer to be booted. Further, the reproducing and/or recording drive can be recognized by the computer as an external reproducing and/or recording drive.

The foregoing and/or other aspects of the present invention are also achieved by providing a computer system, comprising a computer and the display apparatus according to embodiments of the present invention.

The foregoing and/or other aspects of the present invention are also achieved by providing a display method, comprising reproducing and/or recording data from/to a medium, enabling conversion of data read by the reproducing and/or recording drive into a video signal and/or audio signal compatible with a video signal processor and/or an audio output part, both of a display apparatus, enabling transmission of the read data to an external device through an interface, with the interface permitting transmission of data between the external device and the display apparatus, and a switching part selectively enabling the reproducing and/or recording drive to communicate with either the drive playback part or the interface.

According to an embodiment of the present invention, the display method further comprises separating the data read by the reproducing and/or recording drive into video data and/or audio data, converting separated video data into a video signal format compatible with the video signal processor, and converting separated audio data into an audio signal format compatible with the audio output part.

According to an embodiment of the present invention, the converting of the separated video data comprises decoding the separated video data, and converting the decoded video data into the video signal format compatible with the video signal processor. The converting of the separated audio data further comprises decoding the audio data.

The foregoing and/or other aspects of the present invention are also achieved by providing a display apparatus comprising a display displaying an image thereon and a video signal processor converting an input video signal into a displayable format to be available for the display, comprising an optical disk drive reading out data stored in an optical disk, a drive playback part converting the data read by the optical disk drive into a video signal to be available for the video signal processor, an interface transmitting and receiving the data to and from an external device, and a switching part selectively enabling the optical disk drive to communicate with either the drive playback part or the interface.

According to an embodiment of the present invention, the display apparatus further comprising an audio output part outputting a sound, and wherein the drive playback part comprises a signal separator separating the data read by the optical disk drive into video data and audio data, a video signal converter converting the video date into a video signal format to be processed by the video signal processor, and an audio signal converter converting the audio date into an audio signal format to be outputted by the audio output part.

According to an embodiment of the present invention, the video signal converter comprises a video decoder decoding the video data, and a format converter converting the video data decoded by the video decoder into the video signal format to be processed by the video signal processor.

According to an embodiment of the present invention, the audio signal converter comprises an audio decoder decoding the audio data, and a D/A (Digital/Analog) converter converting the decoded audio data into an analog audio signal.

According to an embodiment of the present invention, the drive playback part further comprises a control signal input part generating a control signal to control the optical disk drive and the drive playback part corresponding to a user's operation.

According to an embodiment of the present invention, the optical disk drive and the drive playback part communicate with each other based on the ATAPI protocol.

According to an embodiment of the present invention, the interface comprises an interface converter converting data to be available for an interface protocol supporting communication between the interface and the external device, and to be available for the ATAPI protocol.

According to an embodiment of the present invention, the interface protocol supporting the communication between the interface and the external device comprises either the USB protocol or the IEEE 1394 protocol.

According to an embodiment of the present invention, the external device is a computer supplying a video signal to the video signal processor.

According to another embodiment of the present invention, a computer system comprising a computer comprising a first interface, and a display apparatus comprising a display displaying an image thereon and a video signal processor converting an input video signal into a video signal in displayable format available for the display, an optical disk drive reading out data stored in an optical disk, a drive playback part converting the data read by the optical disk drive into a video signal available for the video signal processor, a second interface connected with the first interface to transmit and receive the data, and a switching part selectively enabling the optical disk drive to communicate with either the drive playback part or the second interface.

According to the embodiment of the present invention, the optical disk drive and the drive playback part communicate with each other based on the ATAPI protocol.

According to the embodiment of the present invention, the first interface and the second interface communicate with each other based on either the USB protocol or the IEEE 1394 protocol.

According to the embodiment of the present invention, the second interface comprises an interface converter converting data available for the interface protocol applied between the first interface and the second interface to be available for the ATAPI protocol, or vise versa.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
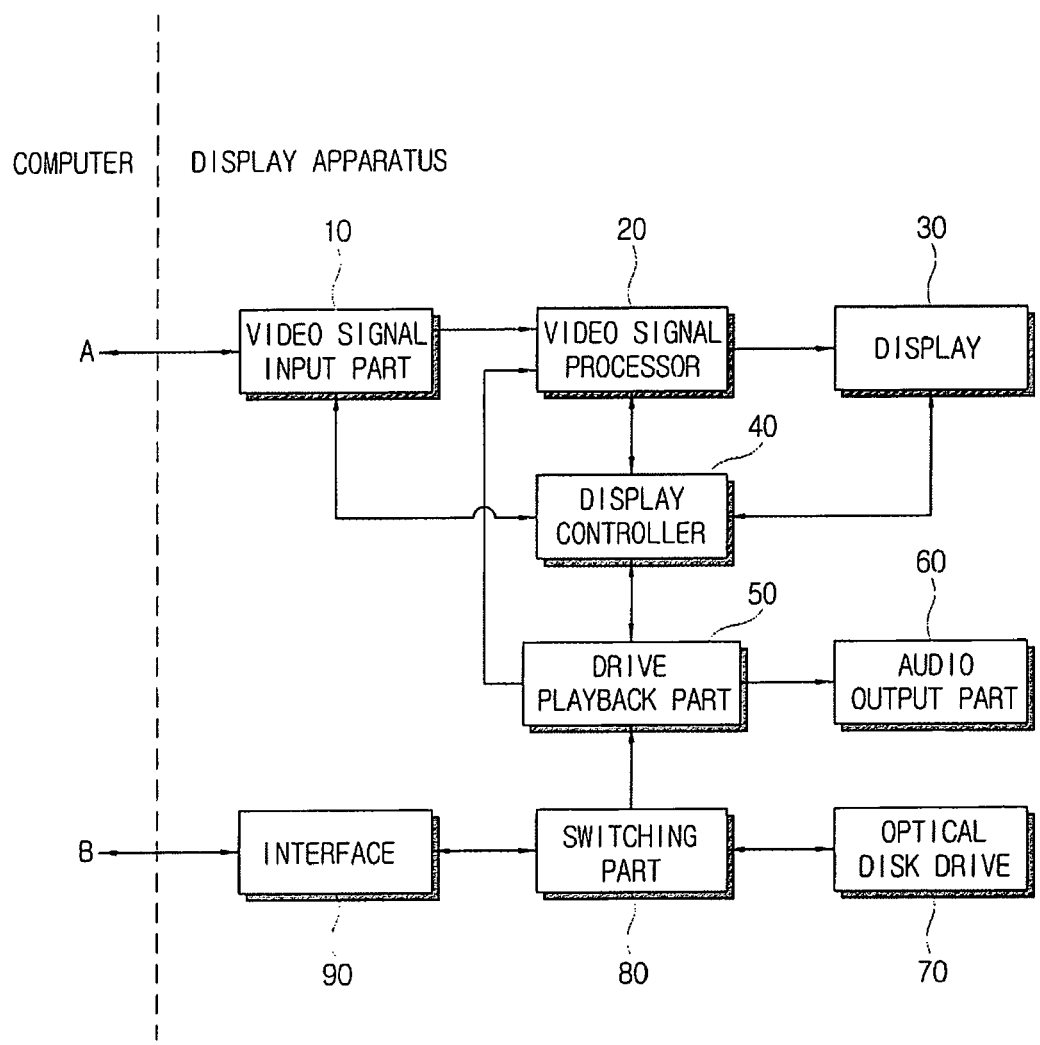
FIG. 1 is a control block diagram of a display apparatus, according to an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures.

As shown in FIG. 1, a display apparatus, according to an embodiment of the present invention, can comprise a video signal input part 10, a video signal processor 20, a display 30, and a display controller 40 controlling the video signal input part 10, a video signal processor 20, and the display 30. Further, the display apparatus, according to this embodiment of the present invention, may comprise an optical disk drive 70, a drive playback part 50, a switching part 80, and an interface 90.

The display 30 displays the video signal from the video signal processor 20. The display 30 may comprise a display module displaying the image and a module driver driving the display module to display the image. Various types of display modules such as a DLP (Digital Light Processing), an LCD (Liquid Crystal Display), and a PDP (Plasma Display Panel), etc., are available for the display module, according to embodiments of the present invention. Here, if the DLP is used as the display module, the module driver may comprise an optical engine. If the LCD is used as the display module, the module driver may comprise a printed circuit board converting the video signal into a data signal and a gate signal.

Figure 2:
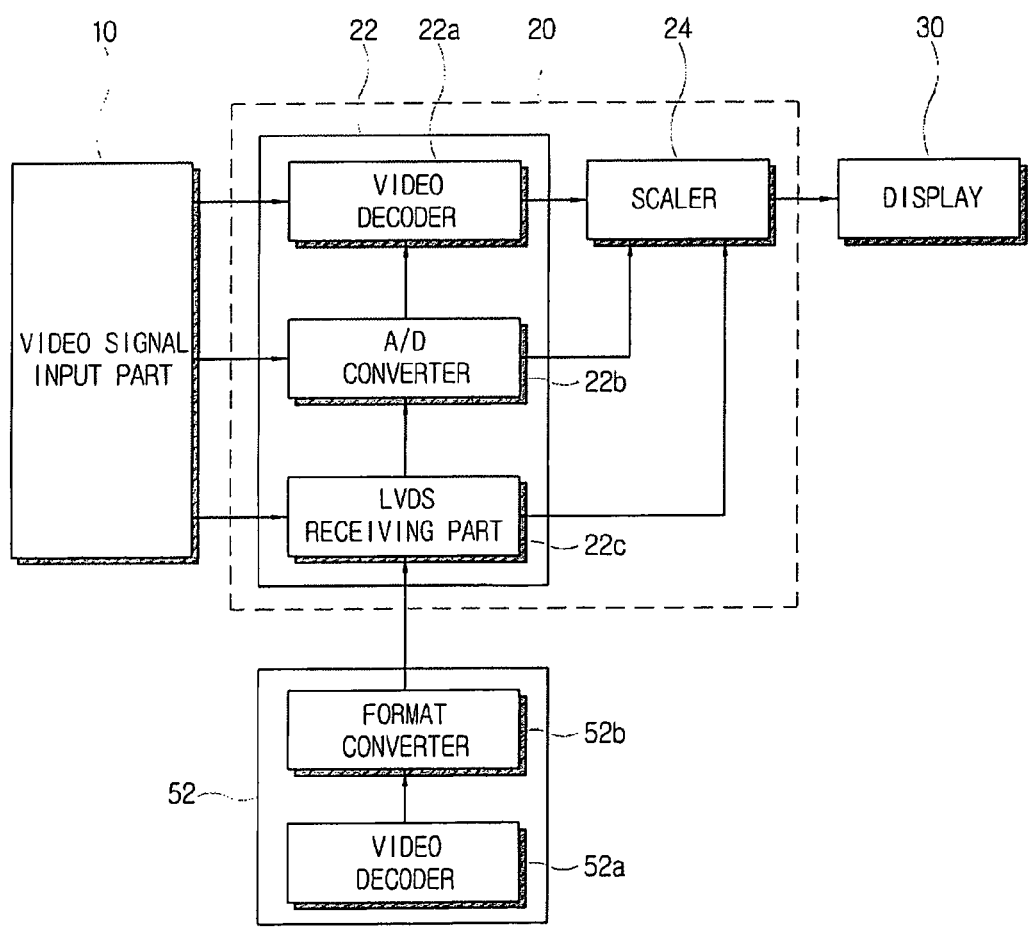
FIG. 2 is a control block diagram of a video signal processor, described in FIG. 1, according to an embodiment of the present invention.

The video signal processor 20 converts the video signal output from the video signal input part 10, or the drive playback part 50, into a displayable format to be available for the display 30. As illustrated in FIG. 2, the video signal processor 20, according to an embodiment of the present invention, may comprise a signal converter 22 converting a video signal from the video signal input part 10, or the drive playback part 50, illustrated in FIG. 1, into a format to be available for a scaler 24. The signal converter 22 may comprise at least one of a TMDS (Transition Minimized Differential Signaling) receiver (not shown), an LVDS (Low Voltage Differential Signaling) receiver 22c, an A/D converter 22b, a video decoder 22a and a tuner (not shown) to correspond with the video signal in various formats. Further, the scaler 24 converts vertical frequency, resolution and screen ratio of the video signal, output from the signal converter 22, to meet an output standard of the display 30.

The video signal input part 10 receives the video signal in various formats from an external device, which may be a computer according to an embodiment of the present invention, and outputs the signals to the video signal processor 20. Herein, the video signal input part 10 can receive the video signal in various formats corresponding to a compositional feature of the signal converter 22. For example, the video signal input part 10 may comprise a D-SUB terminal receiving an analog video signal and transmitting the analog signal to the A/D converter 22b, an analog input terminal such as a composite terminal and a component terminal, etc., and a digital input terminal such as a DVI (Digital Video Interactive) terminal supporting a digital video signal as an input signal.

As further illustrated in FIG. 1, the display controller 40 controls the video signal processor 20, the video signal input part 10, and the display 30. Here, the display controller 40 controls the video signal processor 20, the video signal input part 10, and the display 30 based on a given parameter value to adjust an image displayed on the display 30.

The optical disk drive 70 reads data stored in an optical disk (not shown). The optical disk drive 70 may be a DVD (Digital Versatile Disk) drive according to one embodiment of the present invention, and/or it may also be a CD (Compact Disk) drive.

Herein, according to this embodiment of the present invention, the optical disk drive 70 and the drive playback part 50 communicate with each other using the ATAPI (Advanced Technology Attachment Packet Interface) protocol, other protocols may possibly be applied unless they are not available for the optical disk drive 70. The optical disk drive 70 is interchangeable with other reproducing and/or recording drives, which reproduce and/or record information from/to a medium, e.g., a DVD drive reproducing video data from a DVD.

Figure 3:
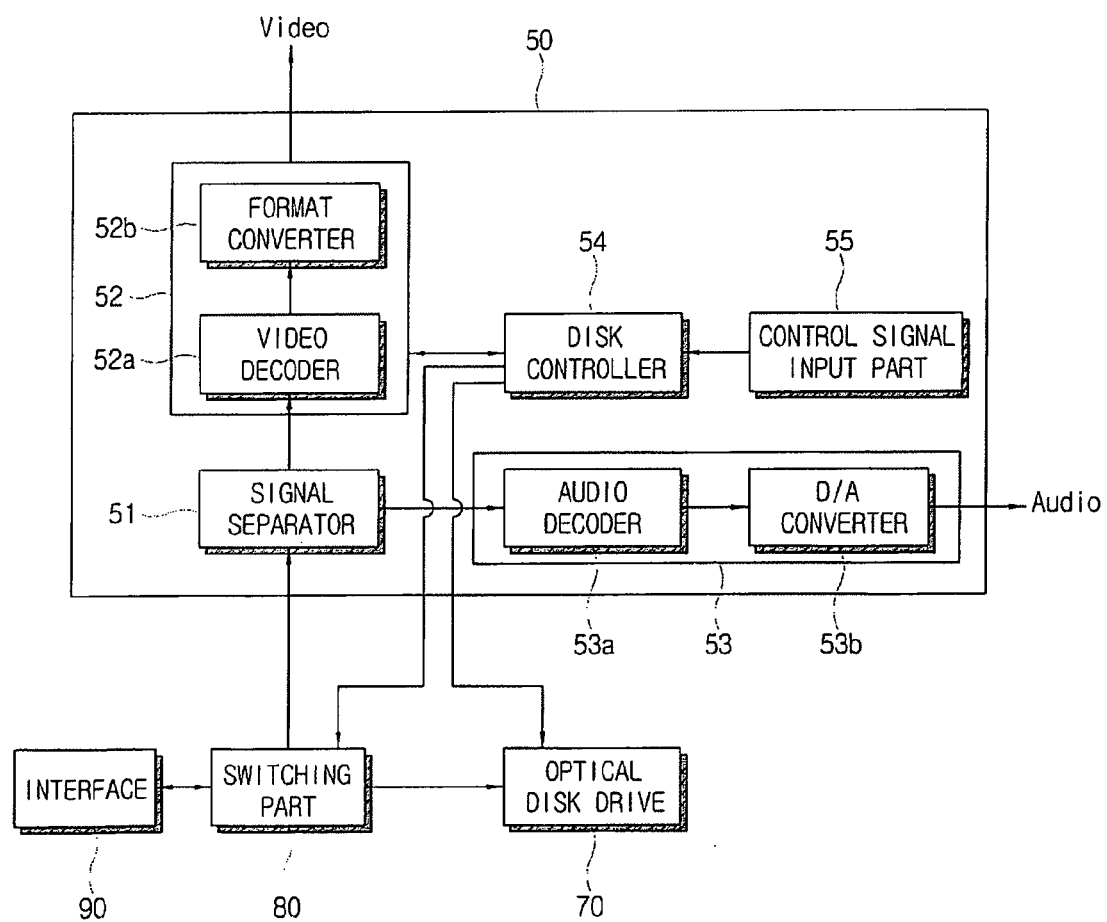
FIG. 3 is a control block diagram of a drive playback part, described in FIG. 1, according to an embodiment of the present invention.

FIG. 3 illustrates the drive playback part 50 using a control block diagram according to an embodiment of the present invention. As shown therein, the drive playback part 50 may comprise a signal separator 51 separating data read by the optical disk drive 70 into video data and audio data, a video signal converter 52 converting the video data received from the signal separator 51 into a video signal format to be available for the video signal processor 20, an audio signal converter 53 converting the audio data received from the signal separator 51 into an audio signal format to be output by the audio output part 60, and a disk controller controlling the signal separator 51, the video signal converter 52, and the audio signal converter 53.

The video signal converter 52 comprises a video decoder 52a decoding the video data from the signal separator 51. Herein, the video decoder 52a includes an MPEG-2 decoder if the optical disk drive 70 is a DVD drive, and the video data in MPEG-2 format is stored therein, according to an embodiment of the present invention. Further, the video decoder 52a supports various decoders such as a JPEG (Joint Photographic Experts Group) decoder to decode video data in various formats.

In addition, the video signal converter 52 may comprise a format converter 52b converting the video signal decoded by the video decoder 52a into a video signal format compatible with the video signal processor 20. Herein, the format converter 52b may comprise various compositional features corresponding to the variously formatted video signals that can be input to the signal converter 22. For instance, the format converter 52b may comprise an LVDS (Low Voltage Differential Signaling) encoder converting the video signal decoded by the video decoder 52a into LVDS format and outputting the video signal in LVDS format. The video signal output from the LVDS encoder is input to the LVDS receiver 22c of the signal converter 22. Herein, the format converter 52b may support video signals in various formats, such as a component signal, a composite signal, and an S-video signal, etc.

The audio signal converter 53 may comprise an audio decoder 53a decoding the audio data received from the signal separator 51, such as an MPEG-2 decoder and/or an AC-3 decoder, etc. Here, the display apparatus, according to an embodiment of the present invention, may further comprise an audio output part 60 to output sound. If the audio output part 60 includes a speaker, the audio signal converter 53 may further comprise a D/A (Digital/Analog) converter 53b converting the audio signal decoded by the audio decoder 53a into an analog signal and outputting the analog signal through the speaker.

Meanwhile, the drive playback part 50, according to an embodiment of the present invention, may further comprise a control signal input part 55 outputting a control signal to the disk controller 54.

The control signal input part 55 generates a control signal corresponding to a user's operation and outputs the corresponding control signal to the disk controller 54. Here, the disk controller 54 controls the drive playback part 50 and the optical disk drive based on the control signal output by the control signal input part 55. The control signal input part 55 may include a plurality of buttons exposed along a side of the display apparatus, or a remote control.

Again, referring to FIGS. 1-3, the switching part 80 selectively enables the optical disk drive 70 to communicate with either the drive playback part 50 or the interface 90 of the display apparatus, and selectively provides data read by the optical disk drive 70 to either the drive playback part 50 or the interface 90.

Here, the switching part 80 may switch based on the control signal from the display controller 40 or the disk controller 54. For example, if the user selects either the drive playback part 50 or the interface 90, through the control signal input part 55, the disk controller 54 can control the switching part 80 based on the control signal output from the control signal input part 55. When the user does not particularly make a selection, e.g., if the user activates the optical disk drive 70 by using the control signal input part 55, the optical disk drive 70 may correspondingly control the switching part 80 to communicate with the drive playback part 50.

The interface 90 of the display apparatus can transmit and receive data to and from the external device. Herein, the interface 90 preferably, but not necessarily, communicates with the external device base on the ATAPI protocol. Accordingly, the external device, e.g., the computer, may perceive the optical disk drive 70 of the display apparatus as an optical disk drive 70 embedded in the computer.

Figure 4:
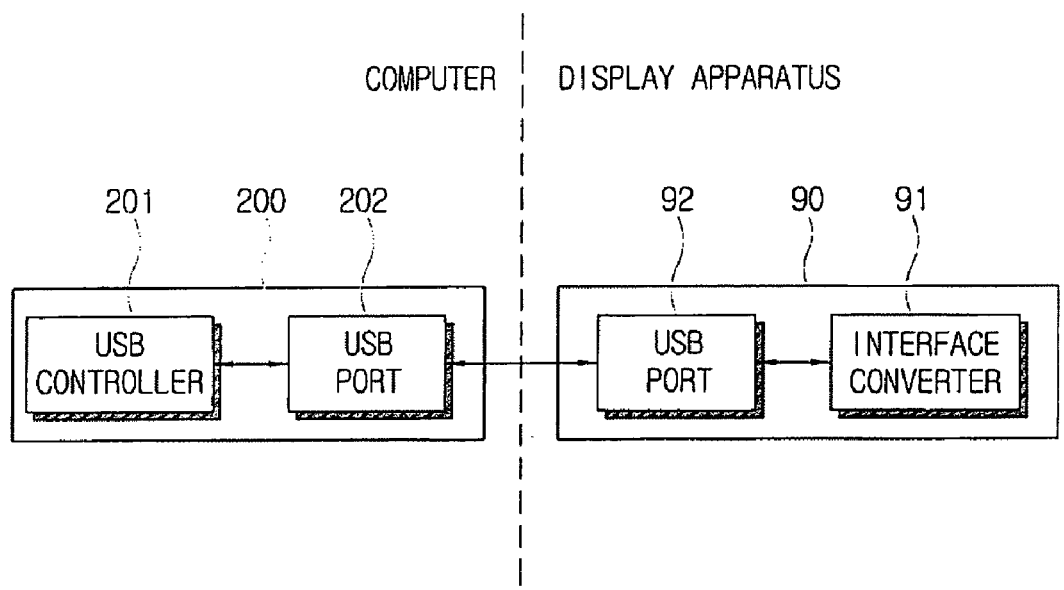
FIG. 4 illustrates a connection between a display apparatus and a computer, according to an embodiment of the present invention.

Further, the interface 90 may also communicate with the external device based on other interface protocols such as the USB (Universal Serial Bus) protocol or the IEEE 1394 protocol. In this case, the interface 90 can comprise an interface converter 91 converting data available for the ATAPI protocol to be available for the USB protocol or the IEEE 1394 protocol, or vise versa, and a connection terminal 92 for the USB protocol or the IEEE 1394 protocol, as illustrated in FIG. 4. Here, FIG. 4 illustrates a USB terminal 92 as an example of the connection terminal. Thus, the data in the ATAPI protocol, transmitted from the optical disk drive 70, is converted into data compatible with the USB protocol or the IEEE 1394 protocol, and transmitted to the external device. In addition, the data in the USB protocol or the IEEE 1394 protocol from the external device can be converted into the data compatible with the ATAPI protocol and transmitted to the optical disk drive 70. Accordingly, the optical disk drive 70 can communicate with the external device by applying various interface protocols, and thus compatibility of the optical disk drive 70 can be increased. Thus, the display apparatus, according to embodiments of the present invention, can support interfaces available for the ATAPI protocol, the USB protocol and IEEE 1394 protocol.

Figure 5:
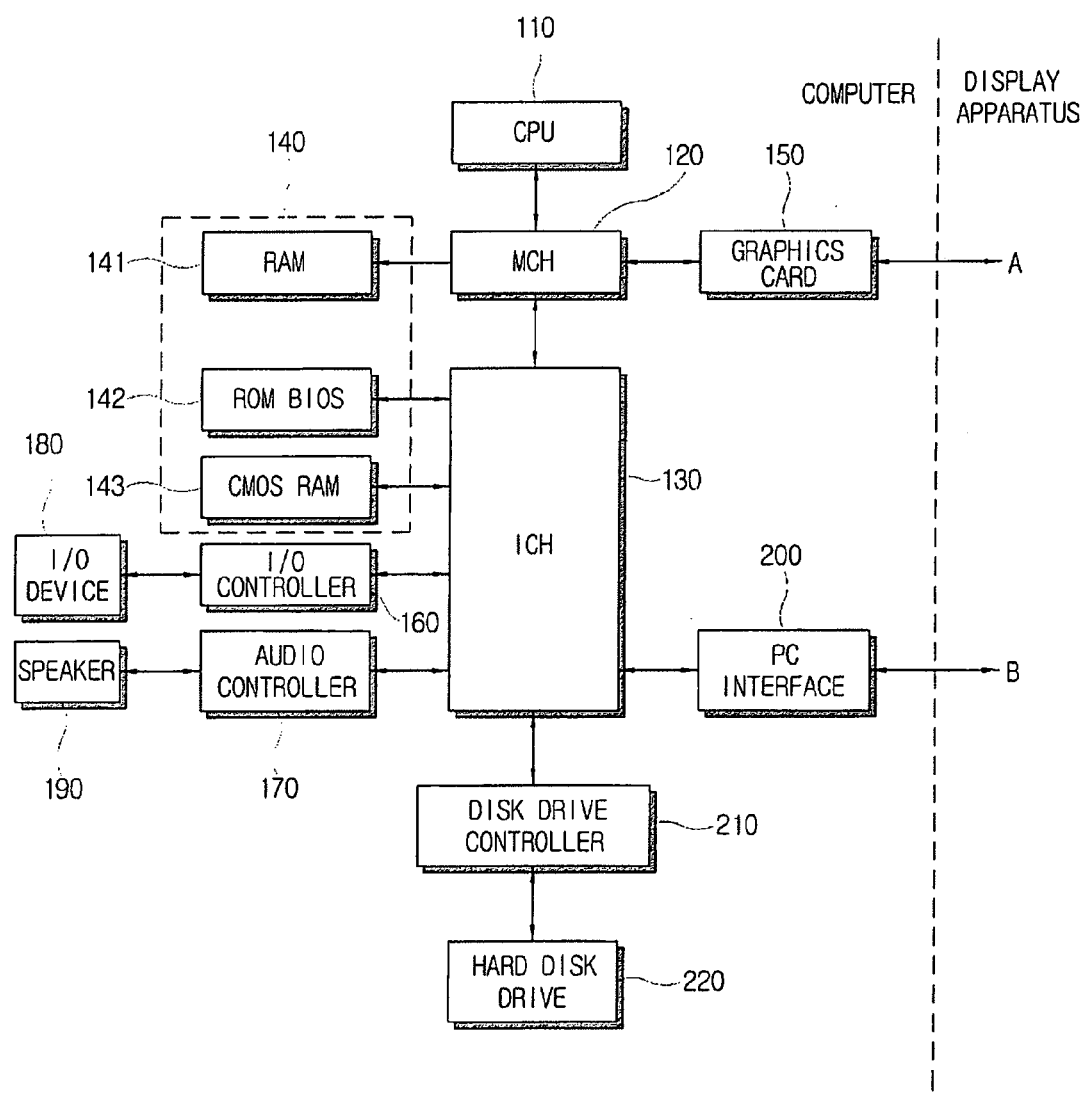
FIG. 5 is a control block diagram of a computer, according to an embodiment of the present invention.

FIG. 5 is a control block diagram of a computer communicating with a display apparatus, through the interface 90, according to an embodiment of the present invention. As shown in FIGS. 4 and 5, the computer can comprise an interface 200 of the computer (hereinafter, "first interface"), corresponding to the interface 90 of the display apparatus (hereinafter, "second interface"). Here, if the second interface 90 of the display apparatus and the first interface 200 communicate each other through a USB interface, the first interface 200 can comprise a USB controller 202 and a USB terminal 204, as shown in FIG. 4. The USB controller 200 may be a single-chip embedded in an I/O control hub 130 (ICH: Input/Output Control Hub).

In addition, the computer according to this embodiment of the present invention can comprise a CPU (Central Processing Unit) 110, a memory 140, a graphic card 150 communicating with the video signal input part 10 to transmit the video signal thereto, an I/O controller 160 processing a signal input through an input device 180, e.g., a keyboard and a mouse, etc., an audio controller 170 connected to the speaker 190 and outputting an audio signal, and a MCH (Memory Control Hub) and the I/O control Hub 130.

Here, the memory 140 can be a non-volatile memory, RAM (Random Access Memory) 141 that is a non-volatile memory, a BIOS embedded ROM-BIOS (Read Only Memory Based Input Output System) 142 and a CMOS (Complementary Metal Oxide Silicon) RAM 143.

The memory control hub 130 is a chipset managing data traveling between the CPU 110, the RAM 141 and the graphic card 150. The I/O control hub 130 is a chipset managing data traveling between the I/O controller 160, the audio controller 170, the ROM-BIOS 142 and the CMOS RAM 143.

Further, a disk drive controller 210 managing a HDD (Hard Disk Drive) 220 can be connected to the I/O control hub 130. Here, it is preferable, but not necessary, that a codec program is installed on the HDD 220 to process the video data and/or the audio data read by the optical disk drive 70.

With the above configurations, a computer according to embodiments of the present invention can perceive an optical disk drive 70 of the display apparatus as an external optical disk drive 70 of the computer, and thereby read the data therefrom and record data thereto.

According to above-described embodiments of the present invention, a computer may further comprise the first interface 200 supporting a USB interface and thereby perceive the optical disk drive 70 of the display apparatus as an external optical disk drive 70 of the computer. Meanwhile, the computer may also communicate with the optical disk drive 70 of the display apparatus without the interface converter 91, based on the ATAPI protocol. In this case, the computer can perceive the optical disk drive 70 of the display apparatus as a slave disk drive of the primary disk drive, or a master or a slave disk drive of a secondary disk drive.

In addition, the audio signal converter 52 comprises the audio decoder 53a and the D/A converter 53b, according to above described embodiments of the present invention, but the D/A converter 53b may be not be needed if the audio output part 60 can process a digital signal in the form of a digital speaker.

Further, the drive playback part 50 may process data in MEPG-2 format or JPEG format, among data read by the optical disk drive 70, according to above described embodiments of the present invention. The drive playback part 50 may enable versatile multimedia functionalities by employing a decoder which can process data in MPEG-1 format, MPEG-3 format, MP3 (MPEG-1 Audio Layer 3) format or DivXTM format. Moreover, the drive playback part 50 may be a single-chip, enabling the versatile multimedia functionalities.

The display apparatus, according to embodiments of the present invention, may comprise the optical disk drive 70 reading out data, the drive playback part 50 converting the data read into a video signal compatible with the video signal processor 20, the second interface 90 transmitting and receiving the data to and from the external device, and the switching part 80 selectively enabling the optical disk drive 70 to communicate with either the drive playback part 50 or the second interface 90. With this configuration, the display apparatus can operate an optical disk drive, such as the DVD drive, without booting the whole computer system.

Also, a display apparatus enabling these multimedia functionalities works like an optical disk drive 70 which the computer would normally perceive as an external optical disk drive 70 of the computer.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus enclosure comprising a display to display an image and a video signal processor to convert an input video signal into a displayable format compatible with the display, the display apparatus enclosure comprising:

a reproducing and/or recording drive reading and/or recording data stored in a medium;

a drive playback part converting data read by the reproducing and/or recording drive into a video signal compatible with the video signal processor;

an interface to transmit the read data to an external device enclosure, with the interface permitting transmission of data from the external device enclosure to the display apparatus enclosure, with the external device enclosure being separate from the display apparatus enclosure and comprising at least a graphic processor capable of converting data into a signal compatible for displaying video; and a switching part selectively enabling the reproducing and/or recording drive to communicate with either the drive playback part or the interface, such that when the reproducing and/or recording drive communicates with the drive playback part, data is transferred from the reproducing and/or recording drive to the drive playback part and not transferred from the drive playback part to the reproducing and/or recording drive, and when the reproducing and/or recording drive communicates with the interface, data is transferred from the reproducing and/or recording drive to the interface and from the interface to the reproducing and/or recording drive, wherein the drive playback part comprises a control signal input part generating a control signal to control the reproducing and/or recording drive, the switching part, and the drive playback part corresponding to a user's operation, and wherein the drive playback part processes data in JPEG format, MPEG-1 format, MPEG-2 format, MPEG-3 format, MP3 (MPEG1 Audio Layer 3) format or DivXTM format and recording data read from a CD (Compact Disk) or a DVD (Digital Versatile Disk), and the drive playback part is provided in a single chip, and the reproducing and/or recording drive is provided in the display apparatus enclosure.

2. The display apparatus enclosure according to claim 1, further comprising an audio output part outputting a sound, and wherein the drive playback part comprises:

a signal separator separating the data read by the reproducing and/or recording drive into video data and audio data;

a video signal converter converting the video data into a video signal format compatible with the video signal processor; and an audio signal converter converting the audio data into an audio signal format compatible with the audio output part.

3. The display apparatus enclosure according to claim 2, wherein the video signal converter comprises a video decoder decoding the video data, and a format converter converting the video data decoded by the video decoder into the video signal format compatible with the video signal processor.

4. The display apparatus enclosure according to claim 2, wherein the audio signal converter comprises an audio decoder decoding the audio data, and a D/A (Digital/Analog) converter converting the decoded audio data into an analog audio signal.

5. A computer system, comprising a computer and the display apparatus enclosure of claim 2, wherein the computer is the external device enclosure communicates with the display apparatus enclosure through the interface.

6. The display apparatus enclosure according to claim 1, wherein the switching part selects the drive playback part or the interface based on user input.

7. The display apparatus enclosure according to claim 1, wherein the reproducing and/or recording drive communicates with the drive playback part based on an Advanced Technology Attachment Packet Interface (ATAPI) protocol.

8. The display apparatus enclosure according to claim 1, wherein the interface further comprises an interface converter converting data output from the reproducing and/or recording apparatus into a compatible protocol for the external device enclosure.

9. The display apparatus enclosure according to claim 8, wherein the compatible protocol for the external device enclosure is a USB or IEEE 1394 protocol.

10. The display apparatus enclosure according to claim 9, wherein the drive playback part converts the data read by the reproducing and/or recording drive for display on the display without requiring the computer to be booted.

11. The display apparatus enclosure according to claim 9, wherein the reproducing and/or recording drive is recognized by the computer as an external reproducing and/or recording drive.

12. The display apparatus enclosure according to claim 1,
wherein the external device enclosure is a computer comprising a first interface, a Central Processing Unit (CPU), and the graphic processor, and
wherein the data transmission of data from the computer to the display apparatus includes a video signal supplied to the video signal processor.

13. A display apparatus comprising a display to display an image and a video signal processor to convert an input video signal into a displayable format compatible with the display, the display apparatus comprising:

a reproducing and/or recording drive reading and/or recording data stored in a medium;

a drive playback part converting data read by the reproducing and/or recording drive into a video signal compatible with the video signal processor;

an interface to transmit the read data to an external device, with the interface permitting transmission of data from the external device to the display apparatus;

a switching part selectively enabling the reproducing and/or recording drive to communicate with either the drive playback part or the interface, such that when the reproducing and/or recording drive communicates with the drive playback part, data is transferred from the reproducing and/or recording drive to the drive playback part and not transferred from the drive playback part to the reproducing and/or recording drive, and when the reproducing and/or recording drive communicates with the interface, data is transferred from the reproducing and/or recording drive to the interface and from the interface to the reproducing and/or recording drive; and an audio output part outputting a sound,
wherein the drive playback part comprises:
a signal separator separating the data read by the reproducing and/or recording drive into video data and audio data;

a video signal converter converting the video data into a video signal format compatible with the video signal processor;

an audio signal converter converting the audio data into an audio signal format compatible with the audio output part; and a control signal input part generating a control signal to control the reproducing and/or recording drive, the switching part, and the drive playback part corresponding to a user's operation, and wherein the drive playback part processes data in JPEG format, MPEG-1 format, MPEG-2 format, MPEG-3 format, MP3 (MPEG1 Audio Layer 3) format or DivXTM format and recording data read from a CD (Compact Disk) or a DVD (Digital Versatile Disk), and the drive playback part is provided in a single chip, and the reproducing and/or recording drive is provided in the display apparatus enclosure.

14. A display method, comprising:
reproducing and/or recording data from/to a medium;
enabling conversion of data read by the reproducing and/or recording drive into a video signal and/or audio signal compatible with a video signal processor and/or an audio output part, both of a display;
enabling transmission of the read data to an external device enclosure through an interface, with the interface permitting transmission of data between the external device enclosure and a display apparatus enclosure comprising a drive performing the reproducing and/or recording data and the display, with the external device enclosure being separate from the display apparatus enclosure and comprising at least a graphic processor capable for converting data into a signal compatible for displaying video; and
selectively enabling the drive to communicate with either a drive playback part performing the enabling of the conversion of data read or the interface,
wherein the selectively enabling the drive to communicate comprises generating a control signal to control the reproducing and/or recording drive, a switching part, and the drive playback part corresponding to a user's operation,
wherein when the reproducing and/or recording drive communicates with the drive playback part, data is transferred from the reproducing and/or recording drive to the drive playback part and not transferred from the drive playback part to the reproducing and/or recording drive, and
when the reproducing and/or recording drive communicates with the interface, data is transferred from the reproducing and/or recording drive to the interface and from the interface to the reproducing and/or recording drive, and
wherein the drive playback part processes data in JPEG format, MPEG-1 format, MPEG-2 format, MPEG-3 format, MP3 (MPEG1 Audio Layer 3) format or DivXTM format and recording data read from a CD (Compact Disk) or a DVD (Digital Versatile Disk), and the drive playback part is provided in a single chip, and
the reproducing and/or recording drive is provided in the display apparatus enclosure.

15. The display method according to claim 14, further comprising:
separating the data read by the reproducing and/or recording drive into video data and/or audio data;
converting separated video data into a video signal format compatible with the video signal processor; and
converting separated audio data into an audio signal format compatible with the audio output part.

16. The display method according to claim 15, wherein
the converting of the separated video data comprises decoding the separated video data, and converting the decoded video data into the video signal format compatible with the video signal processor, and
the converting of the separated audio data comprises decoding the audio data.

17. A computer system comprising:
a computer enclosure comprising a first interface, a Central Processing Unit (CPU), and a graphic processor; and
a display apparatus enclosure comprising a display to display an image thereon and a video signal processor to convert an input video signal into a video signal in displayable format compatible with the display, a reproducing and/or recording drive reading and/or recording data in a medium, a drive playback part converting data read by the reproducing and/or recording drive into a video signal and/or audio signal compatible with the video signal processor, a second interface connectable with the first interface of the computer enclosure, separate from the display apparatus enclosure, to transmit and/or receive data, and a switching part selectively enabling the reproducing and/or recording drive to communicate with either the drive playback part or the second interface,
wherein the drive playback part comprises a control signal input part generating a control signal to control the reproducing and/or recording drive, the switching part, and the drive playback part corresponding to a user's operation,
wherein when the reproducing and/or recording drive communicates with the drive playback part, data is transferred from the reproducing and/or recording drive to the drive playback part and not transferred from the drive playback part to the reproducing and/or recording drive, and
when the reproducing and/or recording drive communicates with the interface, data is transferred from the reproducing and/or recording drive to the interface and from the interface to the reproducing and/or recording drive, and
wherein the drive playback part processes data in JPEG format, MPEG-1 format, MPEG-2 format, MPEG-3 format, MP3 (MPEG1 Audio Layer 3) format or DivXTM format and recording data read from a CD (Compact Disk) or a DVD (Digital Versatile Disk), and the drive playback part is provided in a single chip, and
the reproducing and/or recording drive is provided in the display apparatus enclosure.

18. The computer system according to claim 17, wherein the reproducing and/or recording drive and the drive playback part communicate with each other based on an ATAPI protocol.

19. The computer system according to claim 17, with the first interface and the second interface communicating with each other based on either a USB protocol or a IEEE 1394 protocol.

20. The computer system according to claim 19, wherein the second interface comprises an interface converter to convert data to be compatible with an interface protocol applied between the first interface and the second interface, and/or to convert data to be compatible with an interface protocol applied between the second interface and the first interface, to be compatible with an ATAPI protocol.

* * * * *

UNITED STATES PATENT AND TRADEMARK OFFICE
CERTIFICATE OF CORRECTION

PATENT NO. : 8,396,354 B2  
APPLICATION NO. : 11/126281  
DATED : March 12, 2013  
INVENTOR(S) : Eun-goo Kang et al.

Page 1 of 1

It is certified that error appears in the above-identified patent and that said Letters Patent is hereby corrected as shown below:

In the claims

In Col. 9, Line 26, In Claim 1, delete "DivXTM" and insert --DivX™--, therefor.
In Col. 10, Line 64, In Claim 13, delete "DivXTM" and insert --DivX™--, therefor.
In Col. 11, Line 42 (Approx.), In Claim 14, delete "DivXTM" and insert --DivX™--, therefor.
In Col. 12, Line 38, In Claim 17, delete "DivXTM" and insert --DivX™--, therefor.

Signed and Sealed this
Fifteenth Day of October, 2013

Teresa Stanek Rea
*Deputy Director of the United States Patent and Trademark Office*